US012474920B2

(12) United States Patent
McSweeney et al.

(10) Patent No.: US 12,474,920 B2
(45) Date of Patent: Nov. 18, 2025

(54) TARGETED UPDATES OF STORAGE MANAGEMENT SOFTWARE BASED ON CLASS FILE USAGE

(71) Applicant: Dell Products L.P., Hopkinton, MA (US)

(72) Inventors: Paul McSweeney, Silver Springs (IE); Ellen Murphy, Whites Cross (IE); Caoimhe Ward, Swinford (IE)

(73) Assignee: Dell Products L.P., Hopkinton, MA (US)

( * ) Notice: Subject to any disclaimer, the term of this patent is extended or adjusted under 35 U.S.C. 154(b) by 482 days.

(21) Appl. No.: 17/956,027

(22) Filed: Sep. 29, 2022

(65) Prior Publication Data
US 2024/0111520 A1 Apr. 4, 2024

(51) Int. Cl.
G06F 8/658 (2018.01)
G06F 16/17 (2019.01)

(52) U.S. Cl.
CPC ............ G06F 8/658 (2018.02); G06F 16/173 (2019.01)

(58) Field of Classification Search
CPC .............................. G06F 8/658; G06F 16/173
USPC ......................................................... 717/168
See application file for complete search history.

(56) References Cited

U.S. PATENT DOCUMENTS

| 6,571,257 | B1 * | 5/2003 | Duggan ................. G06F 16/10 711/146 |
| 8,707,292 | B2 * | 4/2014 | Little ....................... G06F 8/61 717/172 |
| 9,021,448 | B1 * | 4/2015 | Gagliardi ................ G06F 8/70 717/133 |
| 11,023,222 | B1 * | 6/2021 | Sethi ...................... G06F 9/542 |
| 2007/0043789 | A1 * | 2/2007 | Cannon ............... G06F 16/1873 707/999.203 |
| 2013/0339604 | A1 * | 12/2013 | Zuluaga ............... G06F 3/0605 711/E12.017 |
| 2020/0117443 | A1 * | 4/2020 | Nandakumar ........... G06F 8/65 |

* cited by examiner

Primary Examiner — Wei Y Mui
Assistant Examiner — Amir Soltanzadeh
(74) Attorney, Agent, or Firm — Anderson Gorecki LLP

(57) ABSTRACT

Customized updates are generated for instances of storage management software running on storage management servers in different storage systems. The filenames of class files used by each instance of the storage management software are stored in respective databases associated with those storage management software instances. Thread dumps are created and searched for class files of the storage management software to create a baseline. The baseline is updated by comparing class files used in response to UI actions and REST API calls and storing names of class files that are not already in the database. To update an instance of the storage management software, the class files of a general update are compared with the filenames in the database associated with the instance and non-matching files are omitted from the customized update foe that instance.

20 Claims, 6 Drawing Sheets

| Action | Type | Classes |
|---|---|---|
| Baseline | - | Alertservice.class |
| Baseline | - | Mailservice.class |
| Create Volume | REST API | CreaVolumeRESTAPI.class |
| Create RDF Group | UI | RDF.html |
| | | RDFCommand.class |

Figure 3

TARGETED UPDATES OF STORAGE MANAGEMENT SOFTWARE BASED ON CLASS FILE USAGE

TECHNICAL FIELD

The subject matter of this disclosure is generally related to data storage management.

BACKGROUND

Storage systems such as Storage Area Networks (SANs) and Network-Attached Storage (NAS) can be used to maintain large storage objects that are used by instances of host applications running on host servers to perform important organizational functions. Examples of host applications may include, but are not limited to, software for email, accounting, manufacturing, inventory control, and a wide variety of other organizational processes. A SAN may include a network of interconnected compute nodes and arrays of managed disk drives. The compute nodes access the drives in response to input-output (10) commands received from the host servers to read and write data to storage objects on behalf of host application instances. A NAS may include a server and direct-attached local drives. NAS servers typically maintain filesystems that enable clients to access high-level data structures by name, e.g., accessing files using filenames. SANs are typically block-based storage systems that respond to IOs that specify logical block addresses (LBAs) of storage objects without having a filesystem that identifies and describes higher-level data structures such as files within the blocks of data. Storage systems may include thousands of nodes and can be configured in a wide variety of different ways. Storage administrators use storage management software such as Dell Unisphere to visualize, analyze, monitor, and configure storage systems.

SUMMARY

All examples, aspects and features mentioned in this document can be combined in any technically possible way.

In accordance with some implementations, a method comprises: monitoring each of a plurality of storage management servers running instances of storage management software to determine which features are used; comparing the features that have been used by the instances of the storage management software on each of the plurality of storage management servers with features being updated by a general update of the storage management software to identify matching features; creating customized updates for each of the respective instances of the storage management software by excluding non-matching features from the customized update for the respective instance of the storage management software; and pushing the customized updates to the respective instances of the storage management software for which the customized updates were created.

In accordance with some implementations, an apparatus comprises: a plurality of storage management servers running instances of storage management software and configured to determine which features are used by those instances of storage management software; and a storage management software updater configured to: compare the features that have been used by the instances of the storage management software on each of the plurality of storage management servers with features being updated by a general update of the storage management software to identify matching features; create customized updates for each of the respective instances of the storage management software by excluding non-matching features from the customized update for the respective instance of the storage management software; and push the customized updates to the respective instances of the storage management software for which the customized updates were created.

In accordance with some implementations, a non-transitory computer-readable storage medium stores instructions that when executed by one or more computers cause the computers to perform a method comprising: monitoring each of a plurality of storage management servers running instances of storage management software to determine which features are used; comparing the features that have been used by the instances of the storage management software on each of the plurality of storage management servers with features being updated by a general update of the storage management software to identify matching features; creating customized updates for each of the respective instances of the storage management software by excluding non-matching features from the customized update for the respective instance of the storage management software; and pushing the customized updates to the respective instances of the storage management software for which the customized updates were created.

BRIEF DESCRIPTION OF THE FIGURES

FIG. 3 illustrates examples of class files that are used to customize customized updates.

DETAILED DESCRIPTION

Some aspects, features, and implementations described herein may include computer devices, components, and computer-implemented steps or processes. It will be apparent to those of ordinary skill in the art that the computer-implemented steps or processes may be stored as computer-executable instructions on a non-transitory computer-readable medium. Furthermore, it will be understood by those of ordinary skill in the art that the computer-executable instructions may be executed on a variety of tangible processor devices. For ease of exposition, not every step, process, or element is necessarily described herein as part of a computer system. Those of ordinary skill in the art will recognize steps, processes, and elements that may have a corresponding computer system or software component. Such computer system and software components are therefore enabled by describing their corresponding steps, processes, or elements, and are within the scope of the disclosure.

The terminology used in this disclosure is intended to be interpreted broadly within the limits of subject matter eligibility. The terms "logical" and "virtual" are used to refer to features that are abstractions of other features, e.g., and without limitation abstractions of tangible features. The term "physical" is used to refer to tangible features that possibly include, but are not limited to, electronic hardware. For example, multiple virtual computers could operate simultaneously on one physical computer. The term "logic" is used to refer to special purpose physical circuit elements, firmware, software, computer instructions that are stored on a non-transitory computer-readable medium and implemented by multi-purpose tangible processors, and any combinations thereof.

Figure 1:
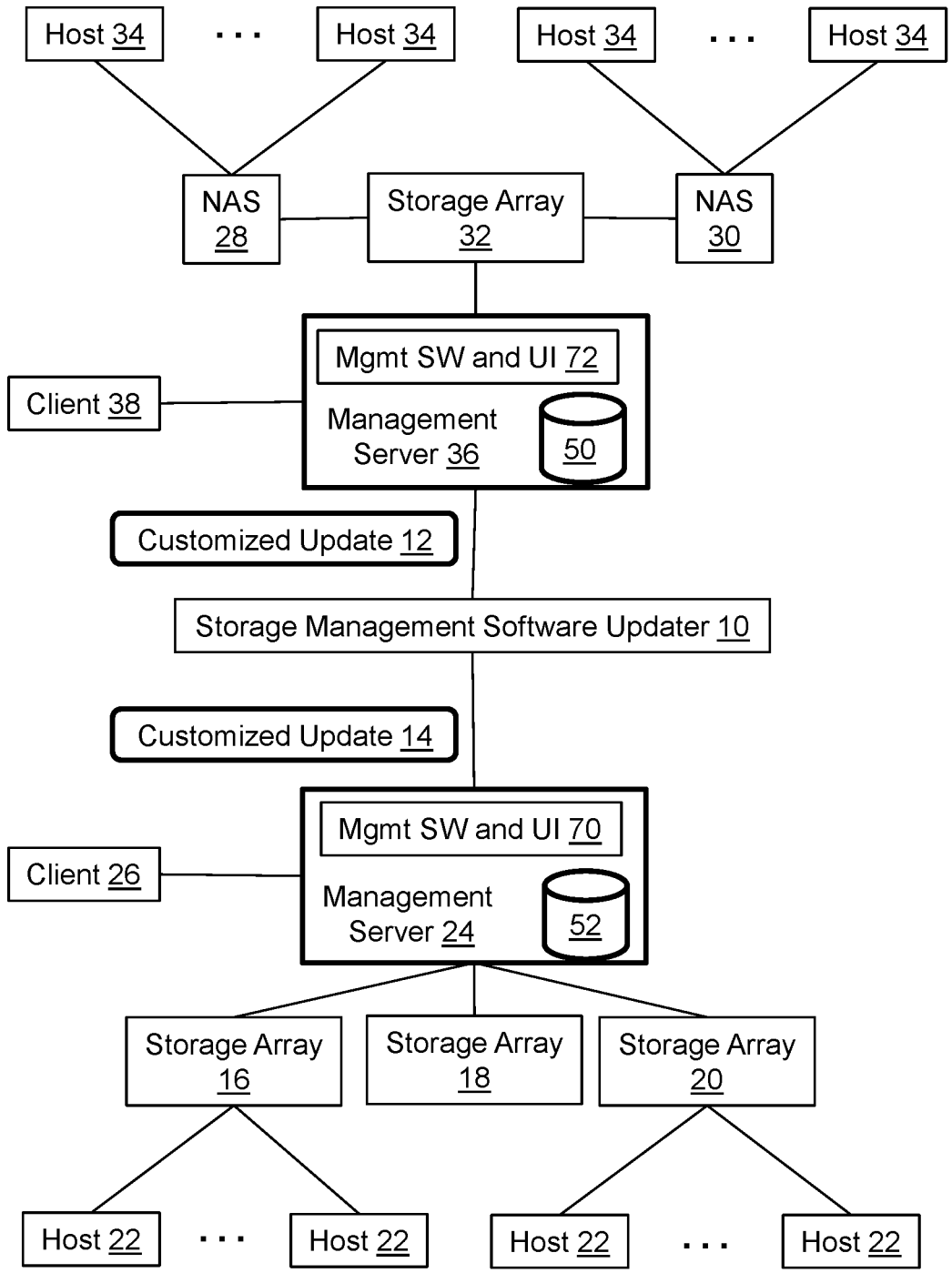
FIG. 1 illustrates a storage management software updater that generates customized updates for different storage systems based on class file usage.

FIG. 1 illustrates a storage management software updater 10 that generates customized updates 12, 14 for instances of storage management software running in different storage systems. The customization is based on class file usage. In the illustrated example, which is presented for context and should not be viewed as limiting, a first data storage system includes multiple storage arrays 16, 18, 20, clusters of host servers 22, and a management server 24. The host servers 22 are tangible server computers with volatile memory, persistent storage, and multi-core processors, and may support virtual machines or containers for simultaneously running multiple instances of host applications. The management server 24 is a tangible computing device that runs storage system management software 70 that is stored on non-transitory memory and runs on a tangible processor. The storage system management software may include a user interface (UI) with a dashboard that presents the state and interconnectedness of storage objects, storage nodes such as the storage arrays and hosts, and interconnecting links. The storage management software can be used directly on the management server and via a client 26 such as a browser. A second data storage system includes NAS servers 28, 30 that share a storage array 32 as their virtual local storage. Host servers 34 access data maintained by the storage array by sending IOs to the NAS servers. The host servers 34 are tangible server computers with volatile memory, persistent storage, and multi-core processors, and may support virtual machines or containers for simultaneously running multiple instances of host applications. A management server 36 is a tangible computing device that runs storage system management software 72 that is stored on non-transitory memory and runs on a tangible processor. The storage system management software may include a UI as described above. The storage management software can be used directly on the management server and via a client 38 such as a browser.

Figure 2:
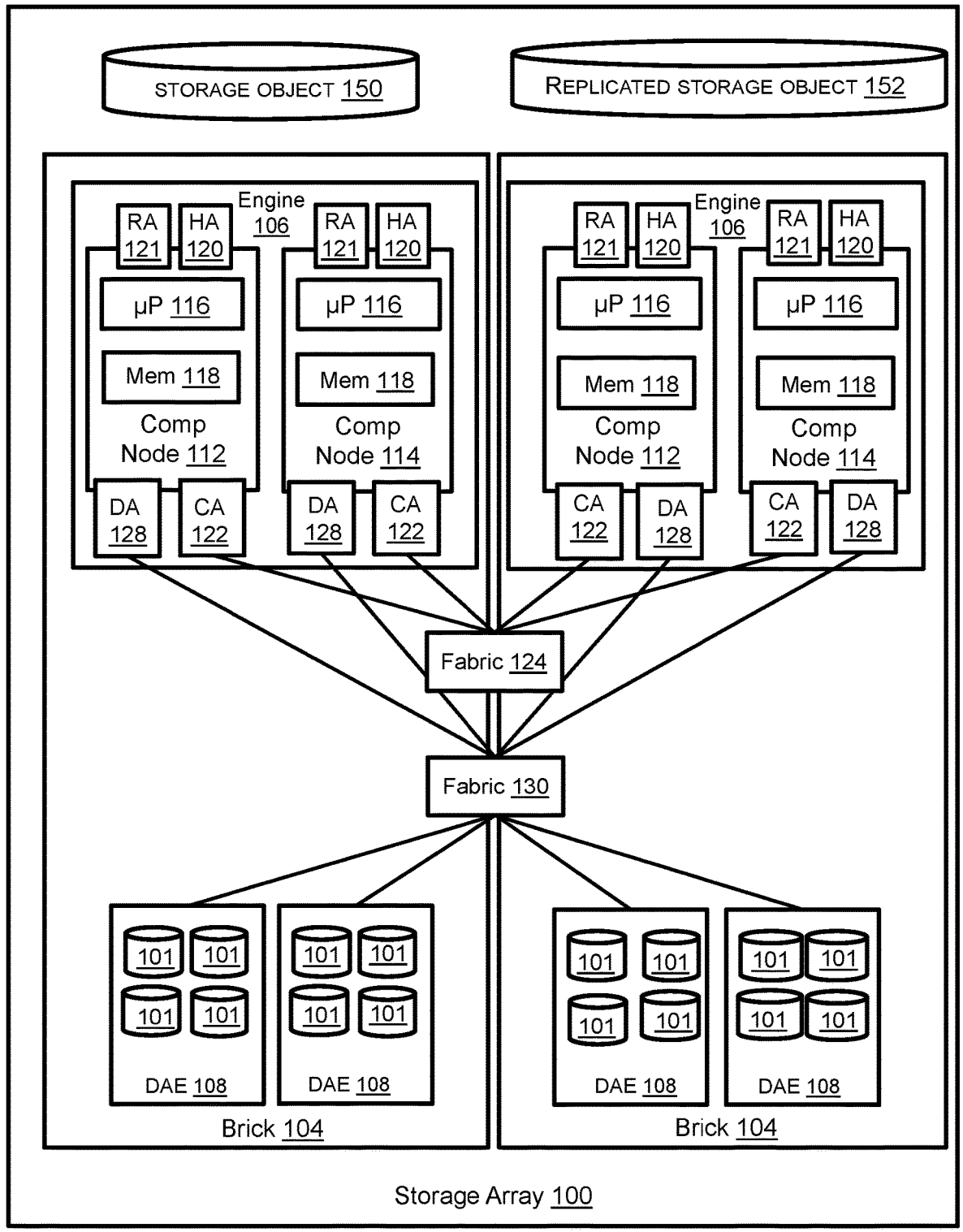
FIG. 2 illustrates a storage array in greater detail.

FIG. 2 illustrates a storage array in greater detail. The storage array 100 includes one or more bricks 104. Each brick includes an engine 106 and one or more disk array enclosures (DAEs) 108. Each engine 106 includes a pair of interconnected compute nodes 112, 114 in a failover relationship with mirrored memory. The compute nodes may be referred to as "storage directors." Although it is known in the art to refer to the compute nodes of a SAN as "hosts," that naming convention is avoided in this disclosure to help distinguish the host servers from the compute nodes 112, 114. Each compute node 112, 114 includes resources such as at least one multi-core processor 116 and local memory 118. The processor may include central processing units (CPUs), graphics processing units (GPUs), or both. The local memory 118 may include volatile media such as dynamic random-access memory (DRAM), non-volatile memory (NVM) such as storage class memory (SCM), or both. Each compute node allocates a portion of its local memory to a shared memory that can be accessed by any compute node within the storage array using direct memory access (DMA). Each compute node includes one or more host adapters (HAs) 120 for communicating with the host servers. Each host adapter has resources for servicing input-output commands (IOs) from the host servers. The host adapter resources may include processors, volatile memory, and ports via which the host servers may access the storage array. Each compute node also includes a remote adapter (RA) 121 for communicating with other storage systems. Each compute node also includes one or more disk adapters (DAs) 128 for communicating with managed disks 101 in the DAEs 108. Each disk adapter has processors, volatile memory, and ports via which the compute node may access the DAEs for servicing IOs. Each compute node may also include one or more channel adapters (CAs) 122 for communicating with other compute nodes via an interconnecting fabric 124. The managed drives 101 include non-volatile storage media such as, without limitation, solid-state drives (SSDs) based on electrically erasable programmable read-only memory (EEPROM) technology such as NAND and NOR flash memory and hard disk drives (HDDs) with spinning disk magnetic storage media. For purposes of explanation, the managed disks described hereafter are same-size SSDs. Disk controllers may be associated with the managed disks as is known in the art. An interconnecting fabric 130 enables implementation of an N-way active-active backend. A backend connection group includes all disk adapters that can access the same disk or disks. In some implementations every disk adapter 128 in the storage array can reach every DAE via the fabric 130. Further, in some implementations every disk adapter in the storage array can access every managed disk 101.

Data created and used by the host application instances running on the host servers is maintained on the managed drives 101 of the storage array. The managed drives 101 are not discoverable by the host servers but the storage array creates logical drives known as storage objects that can be discovered and accessed by the host servers. Without limitation, such a storage object may be referred to as a production volume, source device, production device, or production LUN, where the logical unit number (LUN) is a number used to identify logical storage volumes in accordance with the small computer system interface (SCSI) protocol. From the perspective of the host servers 103, the production volume is a single disk having a set of contiguous fixed-size logical block addresses (LBAs) on which data used by the instances of the host application resides. However, the host application data is stored at non-contiguous addresses on various managed drives 101. The compute nodes maintain metadata that maps between the production volume and the managed drives 101 in order to process IOs from the host servers. The storage array may create and utilize other storage objects that are not discoverable by the host servers, e.g., storage objects at intermediate levels of abstraction between the managed drives and production volumes. Such storage objects are also created and managed with the storage management software.

Referring to FIGS. 1 and 2, the storage systems being monitored and managed by the instances of the storage system management software 70, 72 differ significantly in configuration and use. For context, and without limitation, in the illustrated example the second data storage system the NAS servers 28, 30 may be configured as file servers for the attached host servers 34. The storage array 32 may be configured with RAID and generate local snapshots, but otherwise simply maintain a production storage object 150 that contains files used by the host application instances. In contrast, the first data storage system may be configured for remote data facility (RDF) with storage array 16 configured as a primary site, storage array 20 configured as a secondary site, and storage array 18 may be configured as a disaster recovery site. A first replica R1 of a replicated storage object 152 is maintained on the primary site storage array. A second replica R2 of the replicated storage object is maintained on the secondary site storage array. A third replica R3 of the replicated storage object is maintained on the disaster recovery site storage array. The first replica R1 may be a production storage object that is actively accessed by host servers 22 on which host application instances run. The second replica R2 may be a production or failover storage object that is actively accessed or ready to be actively accessed by other host servers. The third replica R3 may be maintained for disaster recovery. Replica R1 and replica R2 are updated synchronously, whereas replica R3 is updated asynchronously. The secondary site storage array could be active or passive while the primary site storage array is active. Based on this context, it is apparent that the features of the storage management software used on management server 24 may differ from the features used on management server 36.

Updates to the storage management software can be somewhat disruptive. For example, use of the storage management software may have to be temporarily halted while the update is installed, and the management server may require reboot after the update has been installed. Due to the wide variety of possible storage system configurations, the features being updated may not be used on some instances of the storage management software. This is problematic because it is undesirable to create unnecessary disruptions. As will be explained in greater detail below, the problem can be avoided, in whole or in part, by identifying which storage management features are used by individual instances of the storage management software and customizing updates to avoid updating unused features. In the illustrated example, database 50 includes a record of the features used by the storage management software 72 running on management server 36 and database 52 includes a record of the features used by the storage management software 70 running on storage management server 24. Prior to distributing updates, the storage management software updater 10 queries the databases to determine which features have been used by the instances of the storage management software 70, 72 and then creates customized updates for the storage management software instances based on the features that have been used. More specifically, features that have not been used are not updated. In the illustrated example, customized update 12 is created with updates based on the information in database 50 and customized update 14 is created with updates based on the information in database 52.

FIG. 3 illustrates examples of class files that are used to customize updates by serving to identify the features that are used by instances of the storage management software. A Java class file has a .class filename extension and contains bytecode that can run on a Java Virtual Machine (JVM). If a source file has more than one class, each class is compiled into a separate class file. Two of the illustrated classes, Alertservice.class and Mailservice.class, are used when no storage administrator is logged into and using the storage management software. Such class files are considered a baseline. Usage of other class files may be a function of both storage system configuration and how the storage management software instance is used. For example, a UI-only action to create an RDF group using the client could include RDF.html and RDFCommand.class, whereas an action to create a volume via the server using a REST API could include CreaVolumeRESTAPI.class.

Figure 4:
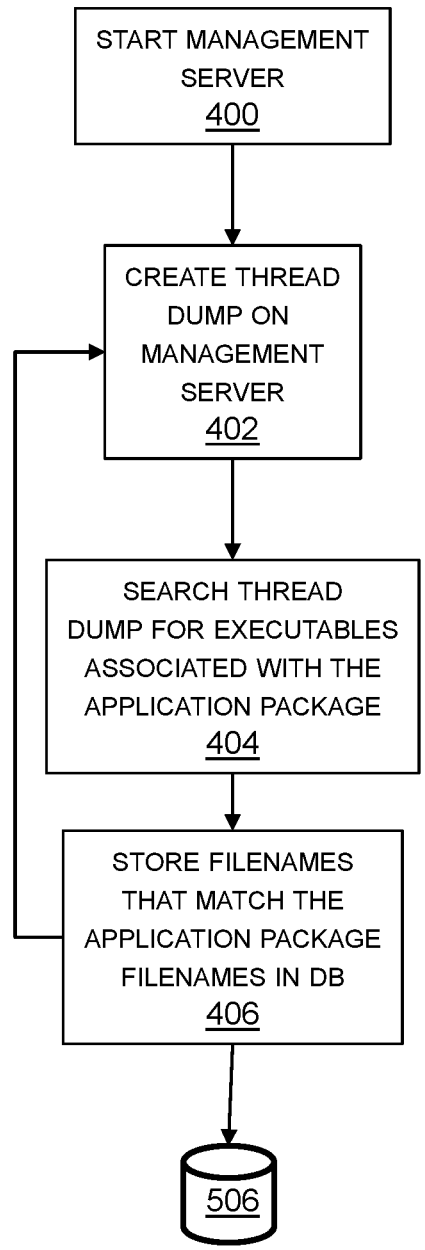
FIG. 4 illustrates creation of a class file usage baseline for an instance of the storage management software.

FIG. 4 illustrates creation of a class file usage baseline for an instance of the storage management software. Following boot of the storage management server in step 400, a thread dump is performed on the storage management server in step 402. This occurs without any users being logged into the storage management software. The thread dump is searched for threads associated with the storage management software (application package) in step 404. The class file names associated with the application package are stored in the database 506 in step 406. This creates a record of the baseline class files that are used by the storage management software, i.e., used even when no storage administrator is logged in.

Figure 5:
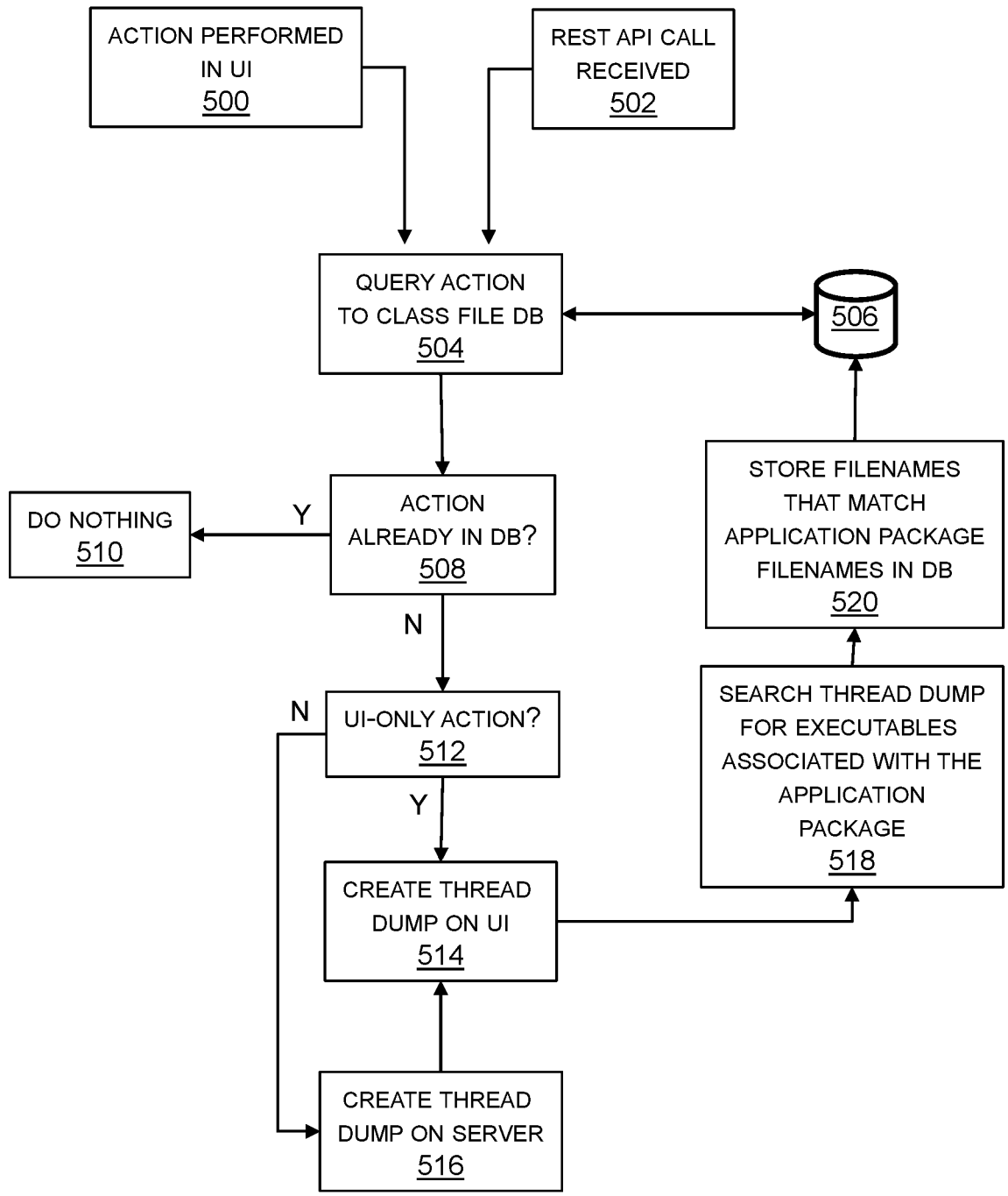
FIG. 5 illustrates creation of a record of class file usage for an instance of the storage management software.

FIG. 5 illustrates creation of a record of class file usage for an instance of the storage management software. In response to either an action performed via the UI in step 500 or receipt of a REST API call via a client in step 502, the database 506 for the storage management software instance is queried in step 504 to determine whether the class file names associated with the action are already present in the database. Nothing further is done if the class file names associated with the action are already in the database as indicated in step 510. Any class file names associated with the action that are not already in the database, as determined in step 508, are added. Step 512 is determining whether the action is UI-only, and thus involves the client. If the action is UI-only, then a thread dump is performed on the UI as indicated in step 514. If the action is not UI-only, then a thread dump is performed on the server as indicated in step 516 and a thread dump is performed on the UI as indicated in step 514. The thread dump, or thread dumps, are searched for the application package name as indicated in step 518 to identify the names of class files associated with use of the storage management software. Class file names that match are stored in the database 506 as indicated in step 520.

Figure 6:
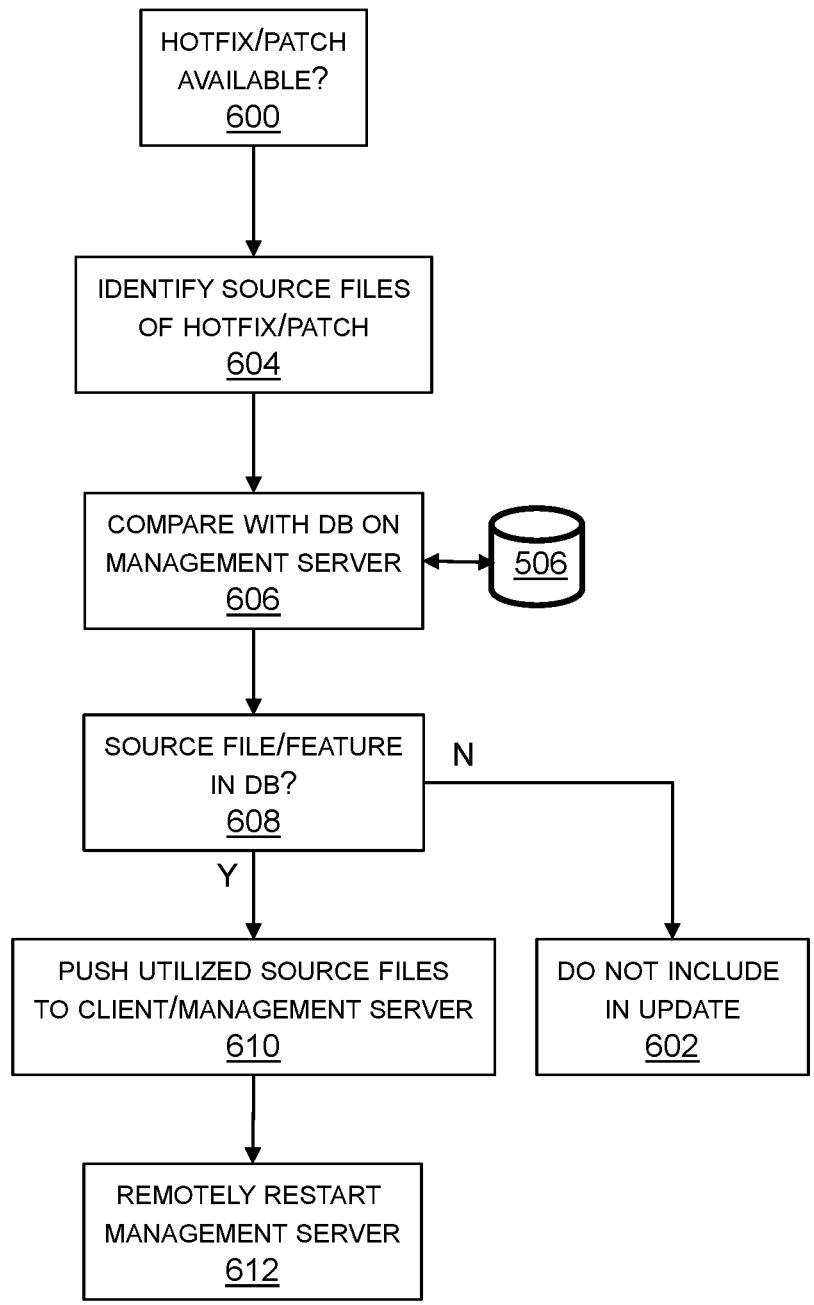
FIG. 6 illustrates generation of customized updates based on class file usage for an instance of the storage management software.

FIG. 6 illustrates generation of customized updates based on class file usage for an instance of the storage management software. When a hotfix or patch for the application package becomes available as determined in step 600, then the filenames of the source files of the hotfix/patch are identified in step 604. The identified filenames of source files are compared with the names of the class files in the respective database 506 maintained by each management server as indicated in stop 606. More specifically, the updater queries the databases. In response to the queries, the databases indicate whether the class files, and thus the features, have been used by the client/UI, storage management server, or both. For each storage management server, source files of the hotfix/patch that do not match class files in the respective database are excluded from the customized update as indicated in step 602. For each storage management server, source files that do match class files in the respective database are included in the customized update. The resulting customized update is pushed to the management server and possibly the client as indicated in step 610. More particularly, the class files are updated on the client/UI, server, or both based on the indication in the database of where the class files have been used. The management server is remotely restarted after the customized update has been installed as indicated in step 612.

In view of the description above it will be understood that each storage management server and client receive updates that are customized by omitting source files that are not in the baseline and have not been used to perform storage management functions with the storage management software instance running on that management server. Thus, superfluous updates are reduced or eliminated, which is advantageous for a storage management software platform that is capable of a wide variety of functions, some of which may never be needed for some storage systems. Further, use of an out-of-date feature will result in additions to the database that will prompt future updates to that feature to be implemented, so the update configuration is not static.

A number of features, aspects, embodiments, and implementations have been described. Nevertheless, it will be understood that a wide variety of modifications and combinations may be made without departing from the scope of the inventive concepts described herein. Accordingly, those modifications and combinations are within the scope of the following claims.

What is claimed is:

1. A computer-implemented method for improving operation of storage management servers by creating customized software updates from a general software update to reduce disruptions associated with installation of general software updates, comprising:
   monitoring, using a computer configured with a storage management software updater stored in memory and run by a microprocessor, each of a plurality of storage management servers running instances of storage management software to determine which features are used by the storage management servers individually, the instances of the storage management software using different sets of features;
   comparing, using the storage management software updater, the features that have been used by the instances of the storage management software on each of the plurality of storage management servers with features being updated by a general update of the storage management software and identifying both matching features and non-matching features between the general update and the features that have been used by individual instances of the storage management software on each of the plurality of storage management servers;
   creating a plurality of different customized updates from the general update, including a respective customized update for each of the respective instances of the storage management software, by excluding code associated with the identified non-matching features from the customized update for the respective instance of the storage management software and including code associated with the identified matching features in the customized update for the respective instance of the storage management software;
   pushing the different customized updates rather than the general update to the respective instances of the storage management software for which the customized updates were created;
   installing the different customized updates on each of the storage management servers running one of the respective instances of the storage management software to which one of the different customized updates was pushed; and
   remotely restarting each of the storage management servers on which one of the different customized updates was installed and running the respective instances of the storage management software inclusive of the customized updates,
   thereby updating individual instances of the storage management software with features selected from the general update that match while avoiding updating those individual instances of the storage management software with features from the general update that do not match.

2. The method of claim 1 further comprising identifying non-matching features by identifying matching file names of class files.

3. The method of claim 2 further comprising generating a baseline by creating a thread dump on each of the plurality of storage management servers and searching the respective thread dumps for files associated with the respective instances of the storage management software.

4. The method of claim 3 further comprising storing filenames of files associated with the respective instances of the storage management software in a respective database associated with the storage management server on which the respective instances of the storage management software run.

5. The method of claim 4 further comprising updating the databases during use by comparing filenames of files used to perform actions via a user interface of one of the instances of the storage management software with filenames in the associated database and, responsive to failure to match any of the filenames to one of the filenames in the database, creating a thread dump on the user interface and storing non-matching filenames of files associated with the instance of the storage management software in the respective database.

6. The method of claim 5 further comprising updating the databases during use by comparing filenames of files used in response to an application programming interface call with filenames in the associated database and, responsive to failure to match any of the filenames to one of the filenames in the database, creating a thread dump on the storage management server, creating a thread dump in the user interface, and storing non-matching filenames of files associated with the storage management software in the database.

7. The method of claim 4 further comprising creating customized updates for each of the plurality of storage management servers by including only class files having filenames that match filenames in the respective database of the storage management server.

8. An apparatus for improving operation of storage management servers by creating customized software updates from a general software update to reduce disruptions associated with installation of general software updates, comprising:
   a plurality of storage management servers running instances of storage management software and configured to determine which features are used by those instances of storage management software individually, the instances of the storage management software using different sets of features; and
   a computer-implemented storage management software updater stored in memory and run by a microprocessor configured to:
      compare the features that have been used by the instances of the storage management software on each of the plurality of storage management servers with features being updated by a general update of the storage management software to identify both matching features and non-matching features between the general update and the features that have been used by individual instances of the storage management software on each of the plurality of storage management servers;
      create a plurality of different customized updates from the general update, including a respective customized update for each of the respective instances of the storage management software by excluding code associated with the identified non-matching features from the customized update for the respective instance of the storage management software and including code associated with the identified matching features in the customized update for the respective instance of the storage management software;

push the different customized updates rather than the general update to the respective instances of the storage management software for which the customized updates were created;

install the different customized updates on each of the storage management servers running one of the respective instances of the storage management software to which one of the different customized updates was pushed; and remotely restart each of the storage management servers on which one of the different customized updates was installed and run the respective instances of the storage management software inclusive of the customized updates, thereby updating individual instances of the storage management software with features selected from the general update that match while avoiding updating those individual instances of the storage management software with features from the general update that do not match.

9. The apparatus of claim 8 further comprising the storage management software updater configured to identify non-matching features by identifying matching file names of class files.

10. The apparatus of claim 9 further comprising the storage management software updater configured to generate baselines by prompting thread dumps on each of the plurality of storage management servers and searching the respective thread dumps for files associated with the respective instances of the storage management software.

11. The apparatus of claim 10 further comprising the instances of the storage management software configured to store filenames of files associated with utilized features in a respective database associated with the storage management server on which the respective instances of the storage management software run.

12. The apparatus of claim 11 further comprising the instances of the storage management software configured to update the databases during use by comparing filenames of files used to perform actions via a user interface with filenames in the associated database and, responsive to failure to match any of the filenames to one of the filenames in the database, create a thread dump on the user interface and store non-matching filenames of files associated with the instance of the storage management software in the respective database.

13. The apparatus of claim 12 further comprising the instances of the storage management software configured to update the databases during use by comparing filenames of files used in response to an application programming interface call with filenames in the associated database and, responsive to failure to match any of the filenames to one of the filenames in the database, create a thread dump on the storage management server, create a thread dump in the user interface, and store non-matching filenames of files associated with the storage management software in the database.

14. The apparatus of claim 13 further comprising the storage management software updater configured to create customized updates for each of the plurality of storage management servers that include only class files having filenames that match filenames in the respective database of the storage management server.

15. A non-transitory computer-readable storage medium storing instructions that when executed by one or more computers cause the computers to perform a method for improving operation of storage management servers by creating customized software updates from a general software update to reduce disruptions associated with installation of general software updates, comprising:

monitoring, using a computer configured with a storage management software updater stored in memory and run by a microprocessor, each of a plurality of storage management servers running instances of storage management software to determine which features are used by the storage management servers individually, the instances of the storage management software using different sets of features;

comparing, using the storage management software updater, the features that have been used by the instances of the storage management software on each of the plurality of storage management servers with features being updated by a general update of the storage management software and identifying both matching features and non-matching features between the general update and the features that have been used by individual instances of the storage management software on each of the plurality of storage management servers;

creating a plurality of different customized updates from the general update, including a respective customized update for each of the respective instances of the storage management software by excluding code associated with the identified non-matching features from the customized update for the respective instance of the storage management software and including code associated with the identified matching features in the customized update for the respective instance of the storage management software;

pushing the different customized updates rather than the general update to the respective instances of the storage management software for which the customized updates were created;

installing the different customized updates on each of the storage management servers running one of the respective instances of the storage management software to which one of the different customized updates was pushed; and remotely restarting each of the storage management servers on which one of the different customized updates was installed and running the respective instances of the storage management software inclusive of the customized updates, thereby updating individual instances of the storage management software with features selected from the general update that match while avoiding updating those individual instances of the storage management software with features from the general update that do not match.

16. The non-transitory computer-readable storage medium of claim 15 in which the method further comprises identifying non-matching features by identifying matching file names of class files.

17. The non-transitory computer-readable storage medium of claim 16 in which the method further comprises generating a baseline by creating a thread dump on each of the plurality of storage management servers and searching the respective thread dumps for files associated with the respective instances of the storage management software.

18. The non-transitory computer-readable storage medium of claim 17 in which the method further comprises storing filenames of files associated with the respective instances of the storage management software in a respective database associated with the storage management server on which the respective instances of the storage management software run.

19. The non-transitory computer-readable storage medium of claim 18 in which the method further comprises updating the databases during use by comparing filenames of files used to perform actions via a user interface of one of the instances of the storage management software with filenames in the associated database and, responsive to failure to match any of the filenames to one of the filenames in the database, creating a thread dump on the user interface and storing non-matching filenames of files associated with the instance of the storage management software in the respective database.

20. The non-transitory computer-readable storage medium of claim 19 in which the method further comprises updating the databases during use by comparing filenames of files used in response to an application programming interface call with filenames in the associated database and, responsive to failure to match any of the filenames to one of the filenames in the database, creating a thread dump on the storage management server, creating a thread dump in the user interface, and storing non-matching filenames of files associated with the storage management software in the database.

\* \* \* \* \*